Sept. 7, 1965  J. PICKLES  3,204,916
VEHICLE SEAT TRACK CONSTRUCTION FOR USE WITH SEAT BELTS
Filed Jan. 13, 1964  3 Sheets-Sheet 1

INVENTOR.
JOSEPH PICKLES
BY
ATTORNEYS

Sept. 7, 1965 J. PICKLES 3,204,916
VEHICLE SEAT TRACK CONSTRUCTION FOR USE WITH SEAT BELTS
Filed Jan. 13, 1964 3 Sheets-Sheet 2
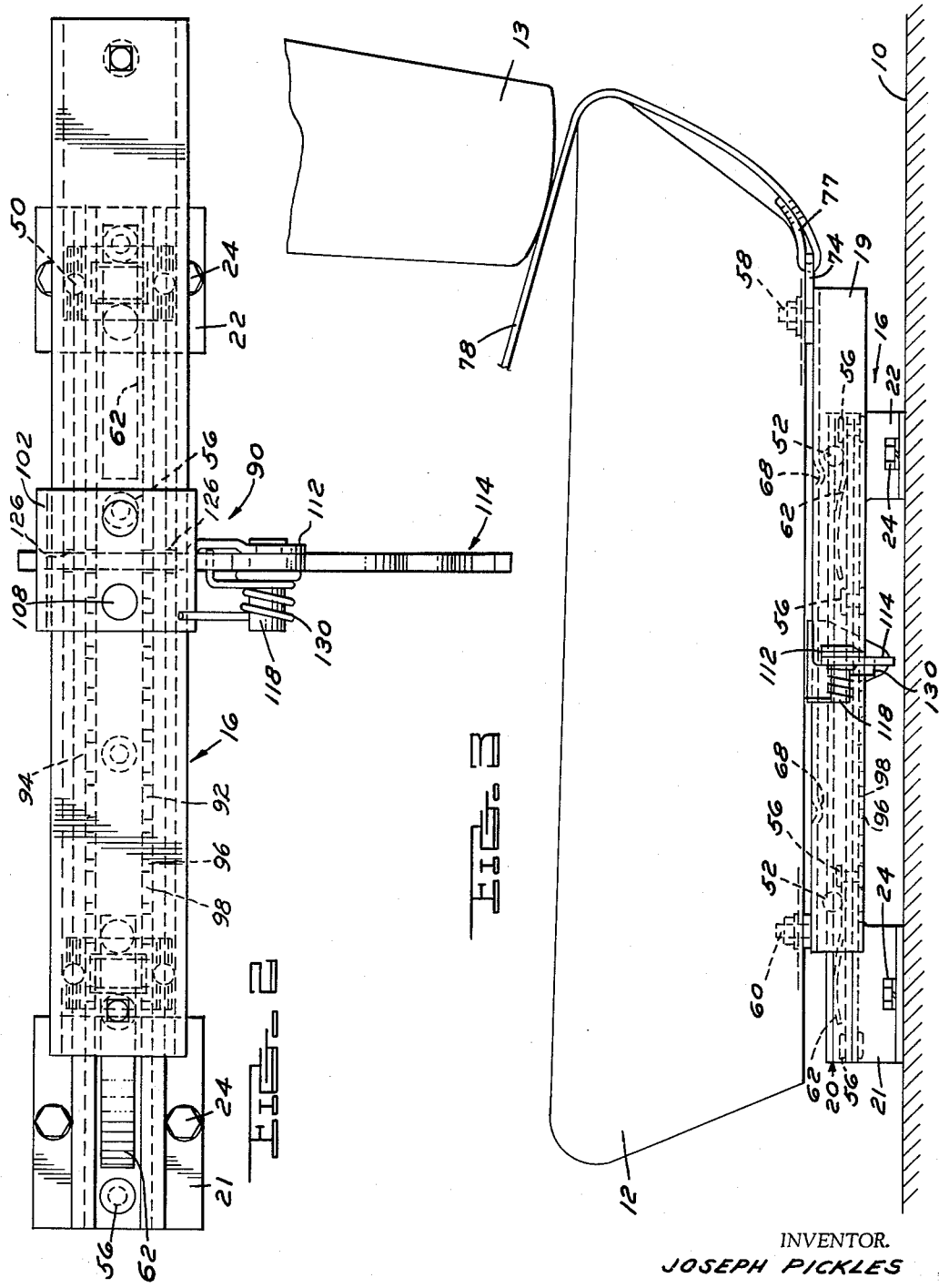
INVENTOR.
JOSEPH PICKLES
BY
ATTORNEYS

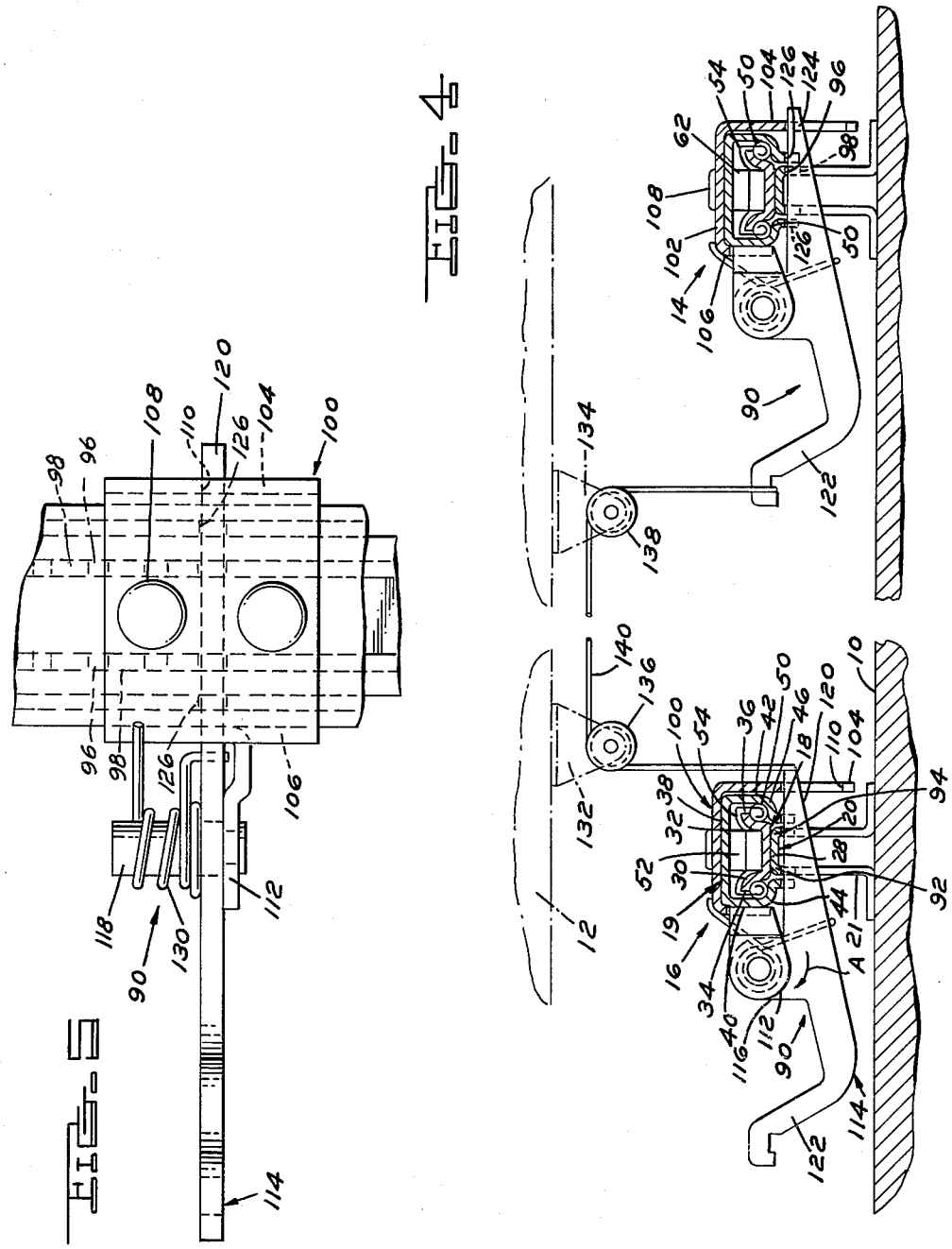

United States Patent Office 3,204,916
Patented Sept. 7, 1965

3,204,916
VEHICLE SEAT TRACK CONSTRUCTION FOR USE WITH SEAT BELTS
Joseph Pickles, Dearborn, Mich., assignor to Ferro Manufacturing Corporation, a corporation of Michigan
Filed Jan. 13, 1964, Ser. No. 337,296
8 Claims. (Cl. 248—429)

The present invention relates to adjustable seats for automobiles and relates more particularly to a seat adjuster mechanism having a pair of slidable track units supporting the vehicle seat for fore and aft movements.

Seat adjuster mechanism embodying slidable track units providing for fore and aft adjustment and positioning of the seat are well-known in the art. Each slidable track unit generally comprises a pair of substantially U-shaped track or channel members, one invertedly encompassing the other. The track or channel members are provided with laterally extending race forming flanges thereon in complementary relationship to each other. A bearing element, usually a small diameter ball, is interposed between each pair of flanges to provide lateral bearing means between the track members. A central bearing element, a ball or roller somewhat larger in size than the lateral bearing elements, is interposed between the opposed base portions of the track members. Generally, the side bearing elements and the center enlarged bearing elements are maintained in a predetermined relationship with one another by a suitable cage device. One of these bearing element assemblies is positioned at each end of the track unit.

In a conventional structure the center bearing element or ball while rolling on the lower track member supports the vertical load of the vehicle seat and its occupants, while the lateral bearing elements or balls merely provide lateral stability. The conventional seat adjuster mechanism is also usually designed to provide a predetermined definite preloading of the structure to permit the seat to operate throughout its normal life without excessive rattling.

A cooperating pair of seat track units of the present invention is designed primarily to provide a sufficiently strong connection between the stationary members or tracks and the movable members or tracks to permit connection of a seat belt to the cooperating unit rather than to the floor or body of the vehicle as is presently the case.

It should be appreciated when the seat is occupied, with the seat belt firmly around the occupant, that when an emergency situation arises, the seat belt is designed to hold the occupant tightly and firmly against the seat so as to avoid serious injury. As a result of the excessive loading created on the seat adjuster assembly during an emergency situation, it has been found that the upper track members separate from the lower track members. As a result thereof a person utilizing a seat belt may still be subjected to undesirable injuries due to the separation of the upper track members from the lower track members. With the present invention each seat track unit utilizes a latching device near the place where the maximum moment occurs, said device including a latch member which, when in a latched position, prevents the track or channel members from separating when under load.

It is an object of the present invention to provide a seat track unit comprising a fixed elongated support having a pair of spaced apart downwardly extending flanges, a lower channel member fixedly mounted on the support and upper channel member which invertedly encompasses the lower member with their base portions in opposed spaced relationship, anti-friction means provided between the channel members to permit lengthwise movement of the upper channel member with respect to the lower channel member, the flanges on the support having downwardly opening notches therein, said upper channel member including a pair of downwardly extending flanges having downwardly opening notches therein, and a latching device mounted on the upper channel member, said device including a pivotally mounted latch bar movable in a vertical plane to engage selected ones of the notches in the flanges of the support and upper channel member, said latch bar when in latching engagement with the notches preventing horizontal displacement of the upper channel member and preventing the flanges of the upper channel member from separating when the unit is subjected to an emergency load so as to maintain the members in assembled relationship.

Another object of the present invention is to provide a seat track unit of the aforementioned type wherein anchor means is carried by the upper channel member adjacent the back end thereof for mounting a seat belt.

It is thus another object of the present invention to provide a simplified, low-cost structure of the aforementioned type having certain advantages contributing to efficiency, reliability and long life, as well as ease of maintenance.

Further objects and advantages of the present invention will be apparent from the following description, reference being had to the accompanying drawings wherein a preferred form of the present invention is clearly shown.

FIGURE 2 is a plan view of the left hand seat track unit illustrated in FIGURE 1 but on a somewhat larger scale.

FIGURE 3 is an elevational view looking in the direction of arrows 3—3 in FIGURE 1.

FIGURE 4 is a view, partly in section, taken on the line 4—4 of FIGURE 1.

FIGURE 5 is a fragmentary enlarged view of part of the track unit illustrated in FIGURE 1.

Figure 1:
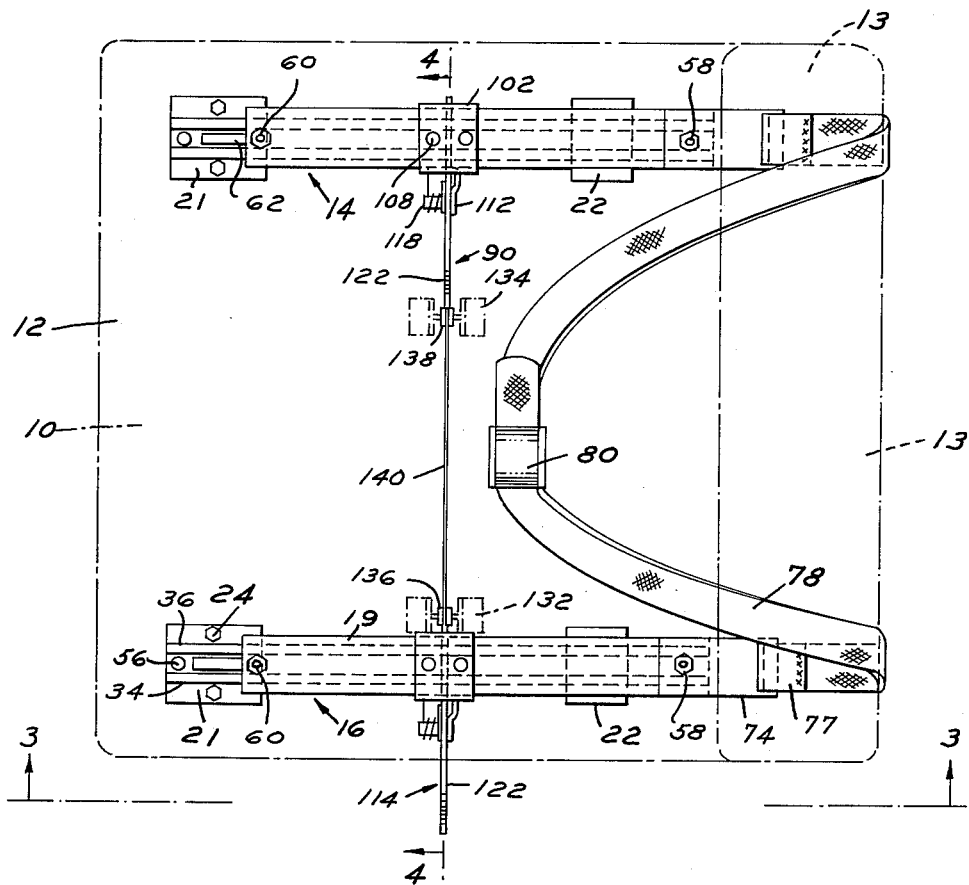
FIGURE 1 is a plan view of the seat track assembly with certain parts removed so as to more adequately illustrate features of the invention.

Referring now to the drawings, the floor of the vehicle is designated by the numeral 10. A seat 12 having a back 13 is adjustably supported upon the floor 10 by a seat adjuster mechanism. The seat adjuster mechanism or assembly comprises two spaced seat track units 14 and 16 secured to the floor and arranged in the manner shown in the plan view in FIGURE 1, so that one unit is arranged beneath each end of the seat 10. Since the two seat track units 14 and 16 are similar to each other in construction, a detailed description of one will suffice and the description will be directed to the left hand seat track unit 16. Each unit is provided with manually operable latching means by which the movable tracks or carriages of both units are normally held against lengthwise movement. Means, to be subsequently described, are provided for effecting identical movements of the movable parts of the two units or devices so that both ends of the seat are adjusted identically and simultaneously. Although this invention will be described in effecting front to rear adjustment of the seat 10, it should be understood that it has utility with a 4-way or a 6-way seat adjusting mechanism.

In general, the seat track unit 16 comprises a lower track or channel member 18 and an upper track member or slide 19. The lower channel member 18 is fixedly mounted at opposite end portions thereof to a fixed support 20 which is provided with legs 21 and 22 at opposite ends thereof which in turn are secured to the floor 10 by bolts 24. Each of the track members 18 and 19 is a substantially U-shaped channel member. The lower track member 18 is provided with a base portion 28 and upwardly extending leg portions 30 and 32 at each side of the base portion. Each of the leg portions 30 and 32 terminates in a laterally extending, outwardly curved flange 34 and 36, respectively.

The upper track member 19 is provided with a base portion 38 and downwardly depending leg portions 40 and 42 at each side thereof. Each of the leg portions 40 and 42 includes a laterally extending but inwardly curved flange portion 44 and 46, respectively.

As seen in FIGURE 4, the upper track member 19 invertedly encompasses the lower track member 18. Each pair of flanges 34, 44 and 36, 46 are complementally curved to form races receiving bearing elements in the form of small balls 50. In a conventional seat track structure the function of the small balls 50 is to provide lateral bearing means between the channel members or track members 18 and 19, and, thus, to control the lateral stability of the seat track unit.

The vertical load on the upper seat track 19 is transmitted to the lower track 18 through bearing elements in the form of rollers 52 somewhat larger in diameter than the balls 50. Each pair of side balls 50 and associated centrally positioned rollers 52 are retained in predetermined lateral position or alignment by means of a bearing cage 54 of any convenient form. It will be understood that there are generally two ball and cage assemblies, one located at each end of the track unit.

The lower track 18 is connected to the elongated fixed support 20 by means of two pairs of rivets 56 which form roller stops as will subsequently be described. The upper track 19 or slide is provided with the necessary retaining device 58 at the rear thereof and the necessary retaining device 60 at the front thereof for supporting and securing the frame of the vehicle seat 10 as best illustrated in FIGURE 3.

It should be noted that wear strips 62 are provided on which the rollers 52 are adapted to roll. Each of the wear strips 62 is located intermediate a pair of rivets 56 located at one of the end portions of the lower track member 18. Each of the wear strips 62 is an elongated member, made of a resilient material such as spring steel. The rear wear strip is preferably anchored at only one end by the outermost rivet or stud 56 securing the track member 18 to the elongated fixed support 20. The front wear strip is secured on the back end thereof by the innermost rivet or stud 56 of the other pair of rivets. The wear strips 62 provide a wear resistance surface for the rollers 52.

The upper channel member 19 is provided with semispherical knolls 68. The knolls 68 act as stops which in part control the range of movement of the upper track member 13 over the rollers 52. In this regard, it will be noted that the four studs or rivets 56 securing the lower track 18 to the elongated fixed supports 20 are provided with enlarged head portions effective to limit the distance each roller 52 may roll relative to the lower track 18.

A plate or bracket 74 is carried by the retaining device 58 which includes a mounting stud and lock nut. The bracket 74 extends rearwardly and is provided with a slot which receives one end 77 of the seat belt 78. The end 77 is secured to the other portion of the belt 78 by stitching or other fastening means. The other end of the seat belt 78 is fastened in like manner to the upper channel member 19 on the unit 14. The seat belt 78 is divided in the middle to form two parts so as to permit the belt 78 to be secured around the occupant of the seat and includes a suitable fastening device 80 which connects the two parts of the belt 78 together as is well known in the art.

It will be appreciated that when an emergency situation arises, the purpose of the seat belt is to hold the person in the seat so as to prevent or limit serious personal injury. It has also been found through experience when a seat belt is mounted on the pair of seat track units in the manner just described that when an emergency occurs, the flanges 40 and 42 of the upper channel members 19 are moved outwardly so as to separate from the lower channel. As a result thereof the upper track or channel member 19 separates from the lower channel member 18 with the result that the occupant is thrown forward towards the windshield of the automobile. Thus, the person could be seriously injured although initial precaution had been taken to fix the seat belt about the body of the person.

In the present invention, each track assembly 14 and 16 is provided with a latching device 90 which is located intermediate the front and rear posts 21 and 22.

The fixed support 20 includes a pair of side flanges 92 and 94. Each side flange 92 and 94 is provided with a series of alternate notches 96 and teeth 98. The latching device 90 includes a frame 100 of substantially channel shape. The frame 100 includes a base 102 having at opposite edges thereof a pair of side flanges 104 and 106 of different lengths. The frame 100 is fixedly connected to the upper channel member 19 by means of rivets 108. One of the side flanges 104 extends downwardly beyond the lower edges of the flanges 40 and 42 provided on the upper channel member 19 and the flanges 92 and 94 provided on the support 20. The flange 104 is provided with an elognated vertically extending slot 110 which is used for a purpose to be hereinafter described. The other flange 106 extends downwardly along the opposing flange 40 of the upper channel member 19. One edge of the flange 106 is provided with a transversely extending pivot post 112.

An operating and latching element 114 is provided with a lug 116 which is pivotally connected to the post 112 by means of a pivot pin 118. The operating and latching element 114 includes on one side of the lug 116 a latching element of bar 120 and on the other side thereof an operating handle 122. It should be noted that the pivot axis of the pin 118 extends substantially parallel to the longitudinal axis of the track assembly 16. With such a construction the latching element 120 is mounted for movement in a vertical plane. The latching element 120 includes an end portion 124 which is received within the slot 110 provided in the flange 104. The lower edges of the side flanges 40 and 42 provided on the upper channel member 19 is each provided with a single notch 126. A coil spring 130 is carried by the pivot pin 118 and has the ends thereof interposed between the latching element 120 and the frame 100 for biasing the latch element 120 into the row of transversely aligned notches provided in the support 20 and upper member 19.

The bottom of the seat support is provided with a pair of downwardly extending brackets 132 and 134 which rotatably carry rollers 136 and 138 respectively. A cable 140 extends over the rollers or pulleys 136 and 138, as best illustrated in FIGURE 4, with one end thereof engaging the end portion 124 of the operating and latching element 114 of the seat track assembly 16 and the other end thereof engaging the operating handle provided on the seat track assembly 14. Thus, actuation of the operating and latching element 114 shown at the left in FIGURE 4 is effective to simultaneously actuate the other element 114 through the cable-pulley arrangement.

It will be appreciated that the latching device 90 performs a dual function. First of all, the latching device 90 is effective to latch the upper channel member or slide 19 in a fixed position. In addition, when the upper track member 19 is subjected to excessive or extreme loads the operating and latching element 114 prevents the sides or flanges 40 and 42 provided on the channel member 19 from separating thus maintaining the upper and lower channel members in predetermined spaced relationship. Thus, when the track member 19 is subjected to extreme load, the bearing elements 50 and 52 will remain in their assembled relationship.

The spring 130 is effective to bias the operating and latching element 114 to the position indicated in FIGURE 4. At such time the latching element 120 is received in the notches 96 provided in the side flanges 92 and 94 and in the notches 126 provided in the side flanges 40 and 42 of the upper channel member 19. When the operating and latching element 114 is pivoted in the direction of arrow A illustrated in FIGURE 4 the latching element is moved out of said notches after which time the upper track member 19 may be adjusted horizontally with respect to the lower track member and support 20. Once the seat has been adjusted and the force removed from the operating and latching element 114 the spring 130 returns the latching element 120 to the position indicated in FIGURE 4.

It should be observed that the alternate notches and teeth 96 and 98 respectively are provided on the fixed support 20 while the latching device 90 is fixedly carried by the upper track member or slide 19. With such a construction when the seat 12 is in a latched position, any emergency load on the slide 19 is carried directly to the elongated fixed support 20 and not through or to the lower track member 18. Thus, it has been found that the rivets 56 will not be subjected to the excessive shear stresses as heretofore when the seat is subjected to an emergency seat belt load. In other words, the rivets 56 will not shear off when such a situation arises.

The seat adjuster mechanism operates in the same manner as prior art devices in that the release of the latching device permits the seat 10 to be moved fore and aft. Once the force on the latching device is removed the spring 130 urges the latching element 120 into the row of transversely aligned notches, which in the present case consist of four notches, one notch in each of the four flanges.

The seat track of the present invention operates very smoothly and freely when unlocked for adjustment but which at the same time is arranged to be firmly locked in a position of longitudinal adjustment and tightly clamped against lateral movement. The important feature of the present invention is the mounting of the operating and latching element 114 in a vertical plane so as to maintain the track members in adjusted positions and to prevent the members from separating from one another when under extreme or damaging load.

The operating and latching element 114 is made from relatively heavy stock such as 3/16 inch metal plate. When the present invention was field tested, it was found that the back end portion of the upper channel member was in tension with the front end portion thereof in compression. The operating and latching element was slightly bent but remained in engagement with the aforesaid four notches so as to prevent separation of the upper and lower channel members.

The drawings and the foregoing specification constitute a description of the improved Vehicle Seat Track Construction for Use with Seat Belts in such full, clear, concise and exact terms as to enable any person skilled in the art to practice the invention, the scope of which is indicated by the appended claims.

What is claimed as my invention is:

1. A sliding seat structure comprising an elongated fixed support having a pair of spaced apart downwardly extending flanges, an upwardly opening lower channel member fixedly mounted on the top surface of said fixed support, a downwardly opening upper channel member invertedly encompassing said lower channel member, each of said channel members having a base portion and a pair of flanges, the base portions of said members being in opposed spaced relationship, anti-friction means provided between said members to permit lengthwise movement of said upper channel member with respect to said lower channel member, the pair of flanges on said support each having a plurality of downwardly opening notches therein, the pair of flanges on said upper channel member extending downwardly, with the edge portions thereof terminating below the top surface of said support, each of said edge portions having a downwardly opening notch therein, and a latching device fixedly mounted on said upper channel member, said device including a pivotally mounted transversely extending latch bar extending underneath and completely across all of said flanges and mounted for movement in a vertical plane to engage a row of transversely aligned notches in the pair of flanges on said support and in the edge portions of the flanges on said upper channel member, said latch bar when in latching engagement in a row of transversely aligned notches preventing horizontal displacement of said upper channel member and preventing the flanges of said upper channel member from separating when the unit is subjected to an emergency load so as to maintain the members in assembled relationship, said latch bar being spaced from and out of contact with said lower channel member.

2. The seat track unit defined in claim 1 wherein said latching device includes a substantially channel shaped frame having a base and a pair of downwardly extending side flanges, the base of said frame being fixedly connected to the base of said upper channel member, one of the side flanges on said frame extending downwardly beyond the lower edge portions of the flanges on said support and said upper channel member, said one side flange being provided with a guide slot for receiving an end of said latch bar, and the other side flange on said frame including a transversely extending post for pivotally mounting said latch bar.

3. The seat track unit defined in claim 1 wherein said latch bar is provided with an operating handle.

4. The seat track unit defined in claim 1 wherein resilient means is provided for biasing said latch bar towards the opposing notches.

5. In an adjustable seat structure for use with seat belts, a fixed rail adapted to be securely fastened to the floor of a vehicle and extending from front to rear thereof, said rail having at opposite sides thereof longitudinally extending outwardly and inwardly facing transversely concave raceways, an inverted channel shaped slide on said rail having depending flanges at opposite sides of said rail which are provided with longitudinally extending transversely concave raceways each of which is in confronting spaced relation to one of the raceways of said rail, bearings received in the confronting pairs of raceways dimensioned to prevent vertically upward movement of said slide relative to said rail except upon movement of the flanges of said slide outwardly from said rail, said rail including a pair of elongated downwardly extending flange members having bottom edge portions which are spaced from the floor of the vehicle, the bottom edge portions of said flange members each having a plurality of downwardly opening notches therein, the flanges on said slide each having a downwardly opening notch therein, and a latching device fixedly mounted on said slide, said device including a pivotally mounted transversely extending latch bar extending underneath and completely across said pair of flanges and said pair of flange members, said latch bar being mounted for movement in a vertical plane to engage a row of transversely aligned notches in the pair of flange members on said rail and in the edge portions of the flanges on said slide, said latch bar when in latching engagement in a row of transversely aligned notches connecting portions of said flanges together below said raceways to positively prevent lateral separation between said flanges and to prevent lengthwise displacement of said slide.

6. The adjustable seat structure defined in claim 5 wherein said latching device includes a substantially channel shaped frame having a base and a pair of side flanges, the base of said frame being fixedly connected to said slide, one of the side flanges on said frame extending downwardly beyond the lower edge portions of the flanges on said slide and being provided with a guide slot for receiving an end of said latch bar, and the other side flange on said frame including a transversely extending post for pivotally mounting said latch bar.

7. The adjustable seat structure defined in claim 6 wherein said latch bar is provided with an operating handle.

8. The adjustable seat structure defined in claim 6 wherein resilient means are provided for biasing said latch bar towards the opposing notches in the flange members of said rail and the flanges of said slide.

References Cited by the Examiner

UNITED STATES PATENTS

| | | | |
|---|---|---|---|
| 2,299,928 | 10/42 | Potter | 308—3.8 |
| 2,307,305 | 1/43 | Saunders et al. | 308—3.8 |
| 2,312,030 | 2/43 | Cramer et al. | 248—430 |
| 2,798,532 | 7/57 | Clark | 248—430 |
| 2,840,139 | 6/58 | Ragsdale | 308—6 |
| 2,947,353 | 8/60 | Von Wimmersperg | 280—150 |

CLAUDE A. LE ROY, *Primary Examiner.*

FRANK B. SHERRY, *Examiner.*